US008757644B2

(12) United States Patent
Satou

(10) Patent No.: US 8,757,644 B2
(45) Date of Patent: Jun. 24, 2014

(54) WHEELCHAIR

(75) Inventor: Mamoru Satou, Akishima (JP)

(73) Assignee: France Bed & Co., Ltd., Akishima-shi, Tokyo (JP)

( * ) Notice: Subject to any disclaimer, the term of this patent is extended or adjusted under 35 U.S.C. 154(b) by 0 days.

(21) Appl. No.: 13/572,889

(22) Filed: Aug. 13, 2012

(65) Prior Publication Data

US 2013/0075991 A1 Mar. 28, 2013

(30) Foreign Application Priority Data

Sep. 28, 2011 (JP) ................................. 2011-213057

(51) Int. Cl.
*B62D 61/12* (2006.01)
*A61G 5/10* (2006.01)

(52) U.S. Cl.
CPC .......... *A61G 5/10* (2013.01); *A61G 2005/1054* (2013.01); *A61G 2005/1083* (2013.01); *A61G 2005/1089* (2013.01)
USPC .... 280/43; 280/43.14; 280/43.17; 280/47.38; 280/47.4

(58) Field of Classification Search
USPC ......... 280/43, 43.13, 43.14, 43.17–19, 43.22, 280/43.24, 47.12, 47.34, 47.38, 47.4, 250.1, 280/767
See application file for complete search history.

(56) References Cited

U.S. PATENT DOCUMENTS 839,624 A * 12/1906 McNeill ..................... 280/43.18
3,442,532 A * 5/1969 Wightman et al. ........... 280/250
4,085,946 A * 4/1978 Krupp ........................ 280/304.1
4,132,423 A * 1/1979 Chant ........................... 280/5.3
4,474,385 A * 10/1984 Costello et al. ............ 280/250.1
4,515,385 A * 5/1985 Christian .................. 280/304.1
4,542,917 A * 9/1985 Waite ............................ 280/650
4,542,918 A * 9/1985 Singleton ...................... 280/650
4,679,849 A * 7/1987 Torgny .......................... 297/330
5,137,295 A * 8/1992 Peek .......................... 280/304.1
5,568,933 A * 10/1996 Mizuno ............................ 280/42
6,047,979 A * 4/2000 Kraft et al. ................. 280/250.1
6,454,285 B1 * 9/2002 Koenig ...................... 280/250.1
6,533,358 B1 * 3/2003 Avihod .......................... 297/380
6,776,430 B2 * 8/2004 White et al. ............... 280/304.1
7,694,990 B2 * 4/2010 Goertzen et al. ........... 280/304.1
8,292,320 B2 * 10/2012 Kigawa ......................... 280/648
8,511,693 B2 * 8/2013 Gass et al. ................. 280/43.17
2003/0189304 A1 * 10/2003 Chen et al. ................. 280/47.38
2004/0212164 A1 * 10/2004 Chen et al. ................. 280/47.38

FOREIGN PATENT DOCUMENTS

JP 3818699 B2 6/2006

* cited by examiner

*Primary Examiner* — J. Allen Shriver, II
*Assistant Examiner* — Travis Coolman
(74) *Attorney, Agent, or Firm* — Holtz Holtz Goodman & Chick PC

(57) ABSTRACT

According to one embodiment, a vehicle frame, front wheel which is formed of a universal caster, a pair of rear wheels, and a lift-up wheel which is formed of a universal caster and is provided at a lower portion of the rear end part of the vehicle frame such that the lift-up wheel is capable of being elevated between a ground-contact position and a non-ground-contact position by an elevation mechanism, the lift-up wheel being configured such that the lift-up wheel, together with the front wheel, movably supports the vehicle frame in a lowered state of the lift-up wheel at the ground-contact position.

6 Claims, 4 Drawing Sheets

WHEELCHAIR

CROSS-REFERENCE TO RELATED APPLICATIONS

This application is based upon and claims the benefit of priority from prior Japanese Patent Application No. 2011-213057, filed Sep. 28, 2011, the entire contents of which are incorporated herein by reference.

BACKGROUND OF THE INVENTION

1. Field of the Invention

The present invention relates to a wheelchair which is configured such that the vehicle width can be varied by attaching/detaching rear wheels.

2. Description of the Related Art

In general, a wheelchair of this kind includes a vehicle frame which is provided with a seat section and a back section, front wheels are provided at a lower portion of a front end part of the vehicle frame, and rear wheels, which are larger in size than the front wheels, are provided on both sides of a rear end part of the vehicle frame. Hand rims, which are slightly smaller in diameter than the rear wheels, are provided on the outside of the rear wheels, so that a user who sits on the seat section can manually rotate the rear wheels.

If the rear wheels with the hand rims are provided on the outside in the width direction of the vehicle frame, the vehicle width of the wheelchair increases. Consequently, the driving of the wheelchair becomes difficult in a narrow place, for example, in a room or in a train.

Taking this into account, the rear wheels are provided to be attachable/detachable to/from the vehicle frame, and lift-up wheels are provided at a lower portion of a rear end part of the vehicle frame such that the lift-up wheels can be elevated. When the rear wheels are to be used, the lift-up wheels are raised so that the lift-up wheels may not come in contact with the ground. When the rear wheels are detached and the wheelchair is used with a reduced vehicle width, the lift-up wheels are lowered and put in contact with the ground.

Thereby, when the wheelchair is driven in a narrow place, for instance, in a room or in a train, the vehicle width is reduced by detaching the rear wheels, and the lift-up wheels are lowered. Thereby, the vehicle frame is supported to be movable by the front wheels and lift-up wheels.

In the prior art, in the wheelchair with the above-described structure, universal casters, which are rotatable not only about a horizontal axis but also about a vertical axis, are used for the front wheels, so that the direction of the vehicle can easily be turned when the wheelchair is moved by pushing hand-push handles which are provided on the back section. However, fixed casters, which can rotate about only the horizontal axis of the horizontal axis and vertical axis, have been used for the lift-up wheels, like the rear wheels.

CITATION LIST

Patent Literature

Patent literature 1: U.S. Pat. No. 3,818,699

BRIEF SUMMARY OF THE INVENTION

Technical Problem

In the case where universal casters are used for the front wheels, if the wheelchair is to be simply moved in a forward direction, there occurs no great problem since the direction of movement of the wheelchair can relatively easily be turned by the front wheels.

However, there is such a case that, for example, in order to transfer the user of the wheelchair, the wheelchair is moved forward in the state in which the rear wheels are detached, and then the wheelchair is moved in a lateral direction and brought alongside of the bed. In this case, if the front wheels alone are universal casters and the lift-up wheels are the above-described fixed casters, it is difficult to move the rear-end side of the wheelchair in the lateral direction. Thus, the wheelchair cannot easily be brought to the lateral side of the bed.

The object of the present invention is to provide a wheel chair which can easily be moved not only in a forward direction but also in a lateral direction.

Solution to Problem

According to the invention, there is provided a wheelchair including:

a vehicle frame including a seat section and a back section;

a front wheel which is formed of a universal caster, the front wheel being provided at a lower portion of a front end part of the vehicle frame;

a pair of rear wheels which are detachably attached to both sides in a width direction of a rear end part of the vehicle frame; and a lift-up wheel which is formed of a universal caster and is provided at a lower portion of the rear end part of the vehicle frame such that the lift-up wheel is capable of being elevated between a ground-contact position and a non-ground-contact position by an elevation mechanism, the lift-up wheel being configured such that the lift-up wheel, together with the front wheel, movably supports the vehicle frame in a lowered state of the lift-up wheel at the ground-contact position.

Advantageous Effects of Invention

According to the present invention, universal casters are used not only for front wheels but also for lift-up wheels.

Thus, when the rear wheels are detached and the wheelchair is moved by the front wheels and lift-up wheels, the wheelchair can easily be moved not only in the forward direction but also in the lateral direction. Therefore, for example, when the user of the wheelchair is to be transferred to the bed, the wheelchair can easily be approached to the lateral side of the bed.

DETAILED DESCRIPTION OF THE INVENTION

An embodiment of the present invention will now be described with reference to the accompanying drawings.

Figure 1:
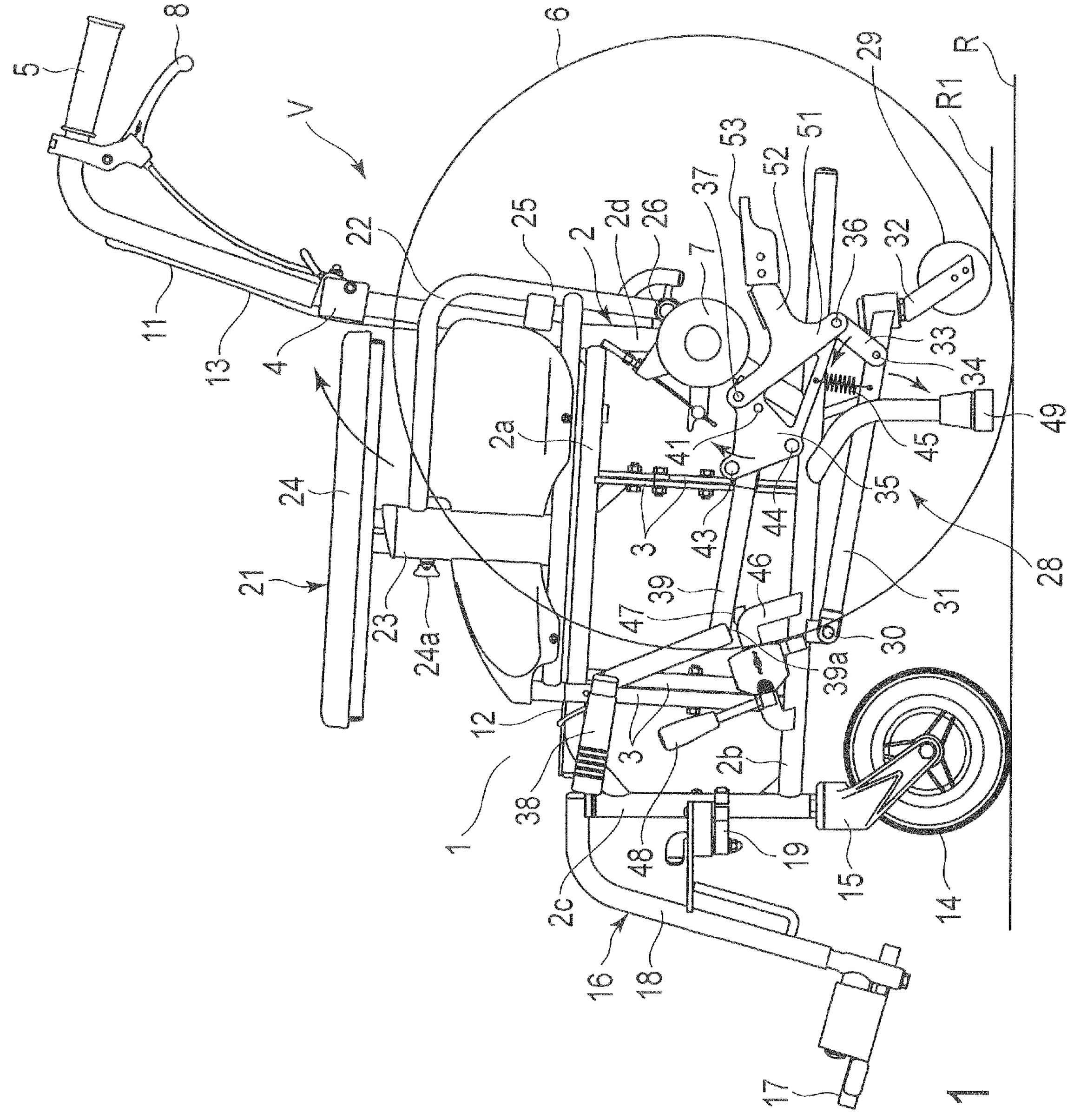
FIG. 1 is a side view of a wheelchair to which rear wheels are attached, according to an embodiment of the present invention.
Figure 2:
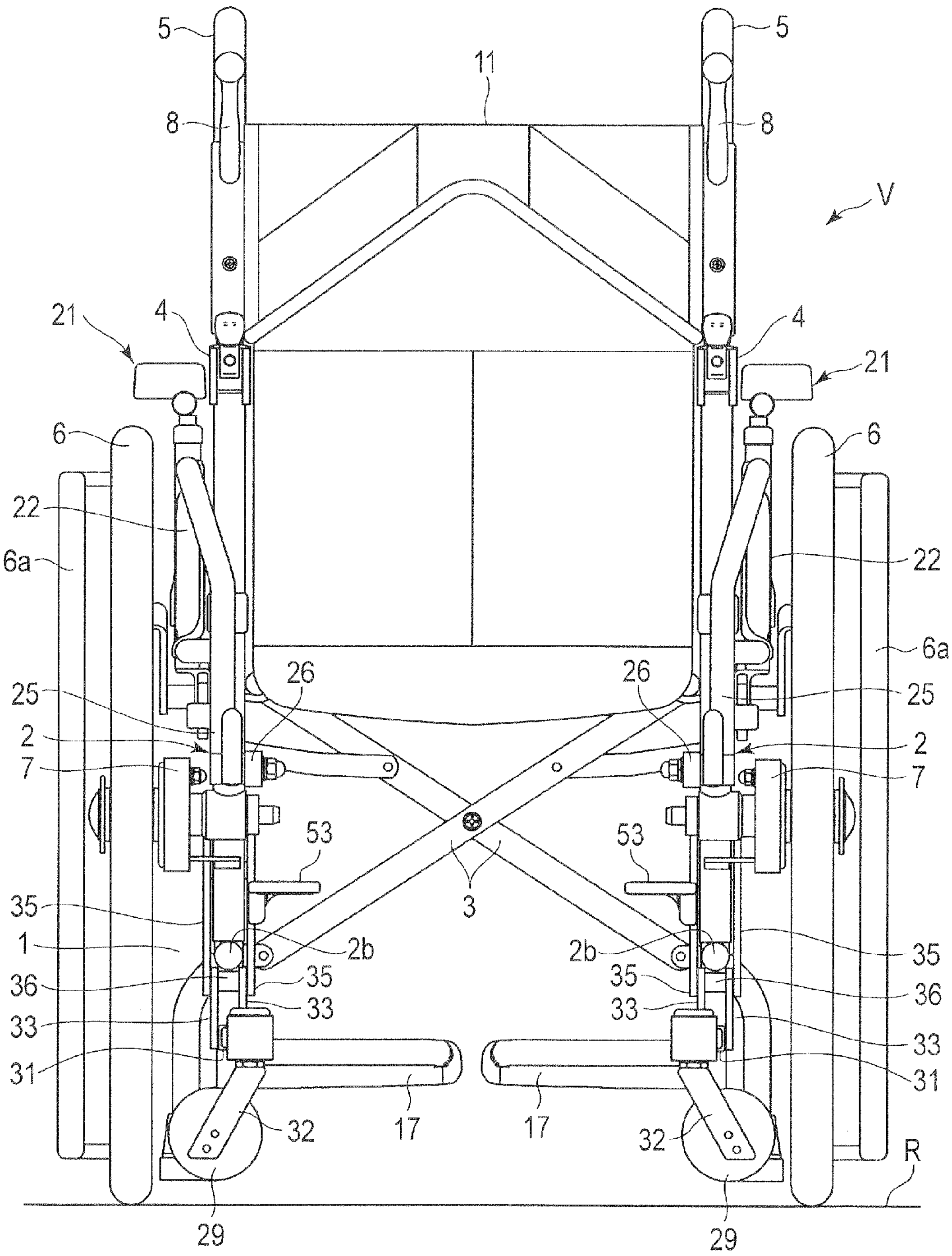
FIG. 2 is a rear view of the wheelchair to which the rear wheels are attached.
Figure 3:
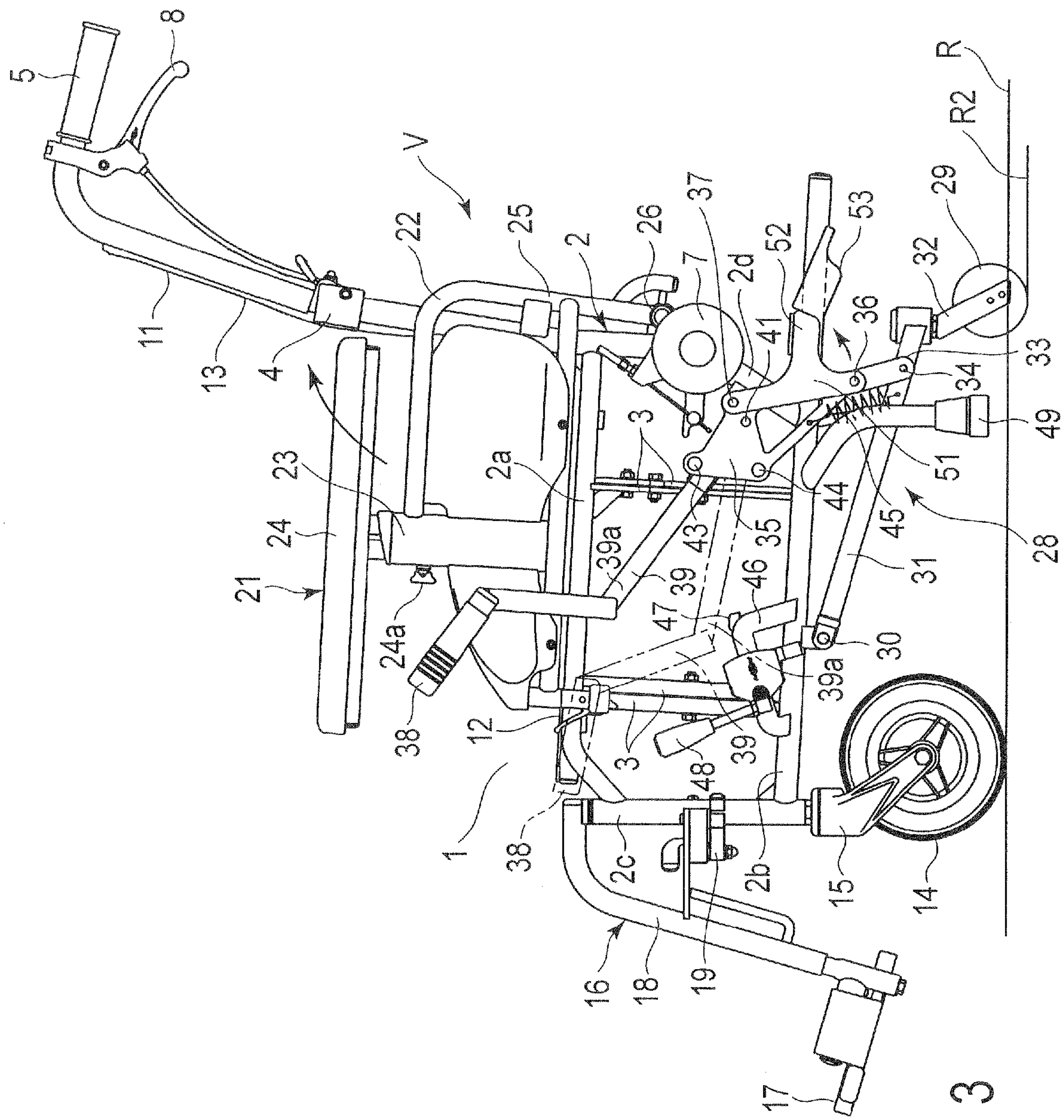
FIG. 3 is a side view of the wheelchair from which the rear wheels are detached.
Figure 4:
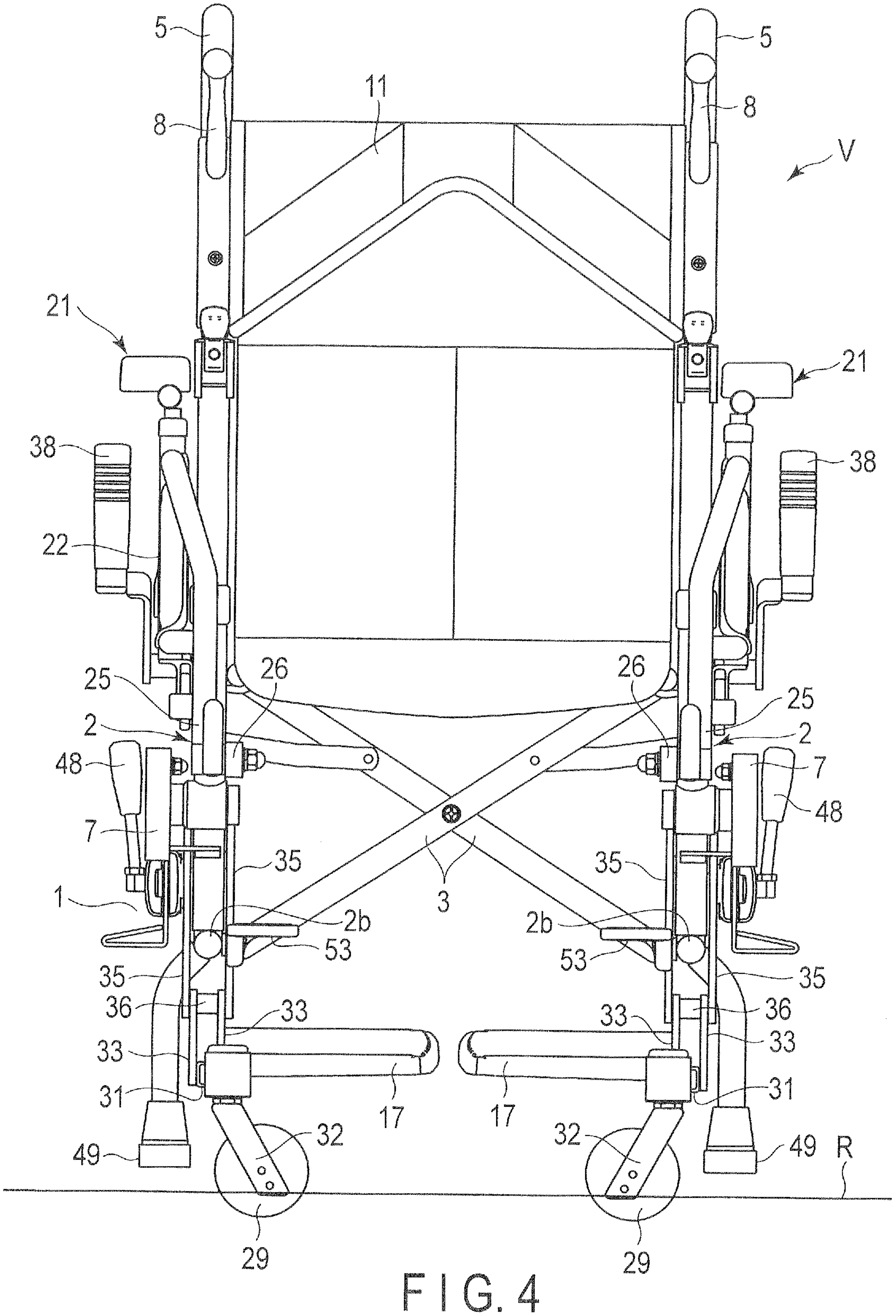
FIG. 4 is a rear view of the wheelchair from which the rear wheels are detached.

A wheelchair V shown in FIG. 1 to FIG. 4 includes a vehicle frame 1. The vehicle frame 1 includes a pair of left and right side frames 2, as shown in FIG. 2 and FIG. 4.

A pair of coupling links 3, which are rotatably coupled at their intermediate portions, are coupled to a front end side and a rear end side of the paired side frames 2. Thereby, the vehicle frame 1 is configured to be foldable by the coupling links 3.

As shown in FIG. 1 and FIG. 3, the side frame 2 is formed in a rectangular frame shape by an upper member 2*a*, a lower member 26, a from member 2*c* and a rear member 2*d*. The 1 mm member 2*b* is formed so as to protrude to the rear end side with a greater length than the upper member 2*a*, and the rear member 2*d* is formed so as to protrude to the upper side with a greater length than the front member 2*c*.

A hand-push handle 5 is provided on an upper end of the rear member 2*d* by a coupling portion 4 such that the hand-push handle 5 is foldable rearward. An attachment member 7 of a rear wheel 6, which includes a hand rim 6*a* (shown in FIG. 2) on an outer surface side thereof, is provided on an intermediate portion of the rear member 2*d*.

The attachment member 7 is configured such that the rear wheel 6 can be detachedly attached to the attachment member 7, and the hand-push handle 5 is provided with a brake handle 8 for manually braking the rotation of the rear wheel 6 which is attached to the attachment member 7.

A bag-like sheet 11 is provided between the upper members 2*a* and rear members 2*d* of the paired left and right side frames 2, thereby forming a seat section 12 between the paired upper members 2*a* and forming a back section 13 between the paired rear members 2*d*, as shown in FIG. 1.

A front wheel 14, which is formed of a universal castor, is provided at a lower end of the front member 2*c* of each side frame 2. Specifically, a lower end of the front member 2*c* is provided with an attachment portion 15 which is provided so as to be rotatable about a vertical axis, and the front wheel 14 is provided on the attachment portion 15 so as to be rotatable about a horizontal axis. Accordingly, the front wheel 14, which is formed of the universal caster, is rotatable in two directions about two axes, i.e. the vertical axis and horizontal axis.

The front wheel 14 and the rear wheel 6, which is attached to the attachment member 7, are set such that their lower ends are at the same height. In short, the rear wheel 6 and the front wheel 14 are set at such a height as to be in contact with a running surface indicated by R in FIG. 1.

As shown in FIG. 1 and FIG. 3, footrest units 16 are detachably provided on the front members 2*c* of the paired side frames 2. Incidentally, FIG. 1 and FIG. 3 show only one footrest unit 16.

The footrest unit 16 includes an attachment pipe 18 of a substantially inverted J shape, which has a lower end at which a footrest 1 is provided such that the footrest 17 is rotatable in a vehicle width direction of the vehicle frame 1 and can be held substantially horizontal in a state in which the footrest 17 is turned inward in the vehicle width direction.

An attachment member 19, which is detachably fixed to the front member 2*c*, is provided at an intermediate portion of the attachment pipe 18. The footrest unit 16 is detachably attached to the front member 2*c* of the side frame 2, such that the upper end of the attachment pipe 18 is abutted on the upper and of the front member 2*c* and the attachment member 19 is detachably fixed to an intermediate portion in the height direction of the front member 2*c*.

Since the footrest unit 16 is detachably attached to the front member 2*c* of the side frame 2, the footrest unit 16 can be removed from the vehicle frame 1. Thus, the front face of the vehicle frame 1 can be approached to, for example, the lateral side of the bed (not shown). Thereby, a user on the bed, with his/her back turned, can easily be transferred onto the seat section 12 of the vehicle frame 1 of the wheelchair V.

Armrest units 21 are provided on upper ends of the paired side frames 2, that is, on both sides in the width direction of the seat section 12. As shown in FIG. 1, the armrest unit 21 includes an armrest frame 22. A cylindrical support member 23 is erectingly provided on an intermediate portion in the back-and-forth direction of the armrest frame 22. The armrest member 24 is attached to tie support member 23 such that the height of the armrest member 24 can be adjusted by an adjusting knob 24*a*.

An extension portion 25, whim has a lower end extending below the seat section 12, is provided at a rear end of the armrest frame 22. The extension portion 25 is rotatably coupled to an intermediate portion of the rear member 2*d* of the side frame 2 by a hinge 26.

Thereby, the armrest unit 21 can be rotated from a use state in which the armrest frame 22 is located on the upper member 2*a* of the side frame 2, to a rearward side of the side frame 2, as indicated by an arrow in FIG. 1, with the hinge 26 functioning as a fulcrum. In other words, the armrest unit 21 can be retreated from both sides in the width direction of the seat section 12.

In the meantime, the armrest unit 21 may be configured such that the armrest unit 21 is detachably attached to the side frame 2 and the armrest unit 21 is detached from the side frame 2 and thus retreated from both sides in the width direction of the seat section 12.

A lift-up wheel 29 is provided on a rear end portion of a lower part of the vehicle frame 1 such that the lift-up wheel 29 can be shifted in an up-and-down direction by an elevation mechanism 28. Specifically, the elevation mechanism 28 includes a support arm 31 having one end rotatably coupled, by a first support shaft 30, to an intermediate portion of the lower member 2*b* of the side frame 2. The other end of the support arm 31 is provided with the lift-up wheel 29, which is formed of a universal caster, like the front wheel 14.

Specifically, the other end of the support, arm 31 is provided with an attachment member 32 which is rotatable about a vertical axis, and the lift-up wheel 29 is provided on the attachment member 32 such that the lift-up wheel 29 is rotatable about a horizontal axis. Accordingly, the lift-up wheel 29 is vertically and horizontally rotatable.

As shown in FIG. 2, one-side end portions of a pair of first links 33, each having a straight rod shape, are rotatably coupled, by a second support shaft 34 shown in FIG. 1, to both sides in the width direction of the other end of the support arm 31. One-side end portions of a pair of second links 35, each having a diamond shape with an opening portion, that is, one-side end portions of the second links 35, which correspond to one corner of the diamond shape, are pivotally attached to the other-side end portions of the first links 33.

Intermediate portions in the back-and-forth direction of the second links 35, which correspond to a corner portion located above the above-described one corner portion, are rotatably coupled by a fourth support shaft 37 to an attachment portion (not shown) which is provided at an intermediate portion in the up-and-down direction of the rear member 2*d* of the side frame 2.

An operation lever 39, which has one end provided with an operation handle 38, has the other end rotatably coupled by a fifth support shaft 41 to an intermediate portion in the back-and-forth direction of the second links 35, this intermediate portion being ricer the fourth support shaft 37. The operation lever 39 is bent in a crank shape in the up-and-down direction.

The operation handle 38 is provided on an upper end side of the operation lever 39, and a lower end of the operation lever 39 is rotatably attached to the second links 35.

Of the other two corner portions of the second link 35, the upper corner portion is provided with a shaft-shaped upper stopper member 43, and the lower corner portion is provided with a shaft-shaped lower stopper member 44. Thereby, the operation lever 39 can freely rotate in the up-and-down direction between a raised position where the other end side of the operation lever 39, which is pivotally attached to the second links 35 by the fifth support shaft 41, abuts on the upper stopper member 43, and a lowered position where the other end side of the operation lever 39 abuts on the lower stopper member 44.

A tension spring 45 functioning as a resilient member for urging upward the other end side of the support arm 31, at which the above-described lift-up wheel 29 is provided, is provided between a lower-side intermediate portion of the second link 35 and an intermediate portion of the support arm 31.

As will be described later, when the operation lever 39 is rotated downward from the raised position shown in FIG. 3 and the other end side of the support arm 31, at which the lift-up wheel 29 is provided, is rotated upward, the tension spring 45 resiliently urges upward the operation lever 39 by the restoring force. Thereby, the lift-up wheel 29 can surely be raised together with the support arm 31.

An attachment member 46, which is formed by bending a pipe material in a bracket (]) shape, is fixed to an intermediate portion of the lower member 2*b* of the side frame 2, which corresponds to the bent portion 39*a* of the operation lever 39. A stopper 47 is attached to one corner portion of the attachment member 46.

When the operation lever 39 is rotated downward, as will be described later, the stopper 47 abuts on the bent portion 39*a*, thereby preventing the operation lever 39 from further rotating downward.

As shown in FIG. 1, when the bent portion 39*a* has abutted on the stopper 47, one end portion of the operation lever 39, at which the operation handle 38 is provided, is lowered to a position which is lower than the seat section 12, that is, to a position which is lower than the upper end of the side frame 2.

The attachment member 46 is provided with, in addition to the stopper 47, a parking brake lever 48 which prevents the rear wheel 6 from rotating when the wheelchair V is stopped.

Furthermore, an auxiliary leg 49, which extends downward, is provided on an intermediate portion of the lower member 2*b* of the side frame 2. A lower end of the auxiliary leg 49 is set at a position which is higher than the lower end of the rear wheel 6, as shown in FIG. 1, and is set at a position which is lower than the lower end of the lift-up wheel 29 which is shifted to a raised position, as will be described later.

Accordingly, if the rear wheels 6 are detached from the vehicle frame 1 and the lift-up wheels 29 are raised, the auxiliary legs 49 come in contact with the ground. Thus, when the rear wheels 6 are detached and the lift-up wheels 29 are raised, the wheelchair V can be prevented from moving.

One end and the other end of a pedal member 51, which has a side surface shape of "T", are coupled to the third support shaft 36, which couples the other end portion of the first the one end of the second link 35, and to the fourth support shaft 36, which couples the second link 35 to the vehicle frame 1. Specifically, the pedal member 51 is provided integral with one side of the diamond-shaped second link 35.

In the meantime, the second link 35 may not be formed in a diamond shape, and one side of the diamond shape may be formed by the pedal member 51.

A projection portion 52 is provided at an intermediate portion of the pedal member 51, and the projection portion 52 is provided with a pedal 53. If the pedal 53, which is at the raised position as shown in FIG. 1, is pushed down and shifted downward as shown in FIG. 3, the pedal member 51 rotates downward, with the fourth support shaft 37 functioning as a fulcrum.

If the pedal member 51 rotates, the first link 33 and second link 35 rotate interlockingly, as shown in FIG. 3, from the state shown in FIG. 1. Accordingly, the support arm 31 rotates such that the other end of the support arm 31 moves downward with the one end thereof functioning as a fulcrum. Thereby, the lift-up wheel 29, which is provided at the other end of the support arm 31, shifts from the raised position to the lowered position.

Next, a mode of use of the wheelchair V having the above-described structure is described.

FIG. 1 snows a state in which the wheelchair V is to be driven by the rear wheels 6 and the front wheels 14. In this case, the operation lever 39 is rotated such that the operation handle 38 is located at the lowered position which is below the seat section 12. Thereby, the lift-up wheel 29 is at a non-ground-contact position R1 above the running surface R.

In the case where the rear wheels 6 are detached from the vehicle frame 1 and the wheelchair V is used with she reduced vehicle width, as shown in FIG. 4, the lift-up wheels 29 are lowered from the non-ground-contact position R1 shown in FIG. 1 to a ground-contact position R2 which is slightly below the running surface R as shown in FIG. 3. Specifically, the user of the wheelchair V or a helper holds the operation handle 38 of the operation lever 39 which is at the lowered position as shown in FIG. 1, and rotates the operation lever 39 upward. Incidentally, the ground-contact position R2 of the lift-up wheel 29 may be at the same height as the running surface R.

If the operation lever 39 at the lowered position is rotated upward, the one end portion of the operation lever 39, which is coupled to the second link 35, abuts on the upper stopper member 43 that is provided on the second link 35. Accordingly, the second rink 35 moves in interlock with the upward rotation of the operation lever 39. Specifically, the second link 35 rotates in a direction indicated by an arrow in FIG. 1, with the fourth support shaft 37 functioning as a fulcrum, while stretching the tension spring 45 against the restoring force thereof.

If the second link 35 rotates, the first link 33 rotates in interlock with the rotation of the second link 35, and rotates in a direction indicated by an arrow in FIG. 1, with the third support shaft 36 functioning as a fulcrum. Thereby, the first link 33 rotates in a rising direction, while the one end thereof, which is coupled to the support arm 31, is being shifted downward. Accordingly, the support arm 31 rotates in such a direction that the other end thereof, at which the lift-up wheel 29 is provided, moves downward, with the one end thereof, which is pivotally attached to the lower member 2*b* of the side frame 2 as shown in FIG. 1, functioning as a fulcrum.

Thereby, the lift-up wheel 29 lowers to the ground-contact position indicated by R2 in FIG. 3. The ground-contact position R2 is slightly below the running surface R with which the rear wheels 6 come in contact. Thus, by lowering the lift-up wheel 29 down to the ground-contact position R2, the rear wheel 6 lifts from the running surface R, and the rear wheel 6 can easily be detached from the attachment member 7 of the vehicle frame 1.

When the lift-up wheel 29 is lowered to the ground-contact position R2, the operation lever 39 is in a raised position indicated by a solid line in FIG. 3. However, the operation lever 39 is rotatably coupled to the second link 35 by the fifth support shaft 41.

Thus, if the operation lever 39 is released from the hand after the lift-up wheel 29 was lowered to the ground-contact position R2, the one end portion of the operation lever 39 lowers until abutting upon the lower stopper member 44 which is provided on the second link 35, as indicated by a chain line in FIG. 3, and the other end portion at which the operation handle 38 is provided is set at such a height position as not to project upward from the seat section 12. The position of the operation handle 38, which is indicated by the chain line, is a neutral position.

In the meantime, the height position of the operation handle 38 at this time may be lower than or substantially equal to the height position of the seat position 12.

When the operation handle 38 is in the neutral position indicated by the chain line in FIG. 3, the one end portion of the operation handle 38 abuts on the lower stopper member 44, and is prevented from rotating downward. Thus, the bent portion 39*a* does not abut on the stopper 47 that is provided on the lower member 2*b* of the side frame 2, and is spaced apart from the stopper 47 at a predetermined distance. Thereby, the operation handle 38 is in such a state that the operation handle 38 can further be rotated downward from the above-described neutral position by a distance between the bent portion 39*a* and the stopper 47.

As stated above, if the rear wheels 6 are detached from the attachment members 7 of the vehicle frame 1 after the lift-up wheels 29 are lowered to the ground-contact position R2, the vehicle width of the wheelchair V can be reduced. Thus, even in a narrow space, for example, in a train or in a room, the wheelchair V can easily be moved.

The wheelchair V, from which the rear wheels 6 have been removed, can be moved by the front wheels 14 which are formed of universal casters, and the lift-up wheels 29 which are similarly formed of universal casters. The front wheels 14 and lift-up wheels 29, which are formed of universal casters, are configured to rotate about the vertical axis and horizontal axis.

Accordingly, the front wheels 14 and lift-up wheels 29 rotate such that the direction of running can easily be varied by the force that is applied to the vehicle frame 1 by the helper. For example, when the user sitting on the wheelchair V is to be transferred onto the bed, the wheelchair V is moved straight to the lateral side of the bed, and then the wheelchair V is pushed in the lateral direction. Thereby, the wheelchair V can be brought alongside of the bed.

Thus, after the wheelchair V is brought alongside of the bed, one armrest unit 21 on the bed side is rotated to the rear side of the vehicle frame 1, as indicated by the arrow in FIG. 3, with the hinge 26 functioning as a fulcrum, and is retreated from the lateral side of the seat section 12. Thereby, the user sitting on the wheelchair V can easily be moved onto the bed.

At this time, since the other end portion of the operation lever 39, at which the operation handle 38 provided, is at such a height as not to protrude above from the seat section 12, the operation lever 39 or operation handle 38 does not become an obstacle to the movement of the user.

On the other hand, when the lift-up wheels 29, which are lowered to the ground-contact position R2 as shown in FIG. 3, are to be raised up to the non-ground-contact position R1 shown in FIG. 1, the operation lever 39, which is in the neutral position as indicated by the chain line in FIG. 3, is pushed down and rotated until abutting on the stopper 47.

Thereby, since the lower stopper member 44 provided on the second link 35 is pushed downward by the one end portion of the operation lever 39, the second link 35 rotates with the fourth support shaft 37 functioning as a fulcrum, such that toe one end portion of the second link 35, to which the first link 33 is coupled, rotates in a direction indicated by an arrow in FIG. 3. Thus, one side of the second link 35 and the first link 33, which have been in a substantially straight shape, are bent in an angle bracket (>) shape as shown in FIG. 1.

If the one side of the second link 35 and the first link 33 are bent in the angle bracket (>) shape, the first link 33 further rotates in a direction of bending, by the restoring force of the tension spring 45 which acts on the support arm 31. Since the second link 35 also moves in interlock with the rotation of the first link 33, the one end of the second link 35, to which the first link 33 is coupled, rotates in direction of rising.

As a result, the first link 33, second link 35 and operation lever 39 are set in the state indicated by the solid line in FIG. 1. Specifically, the link 35 rotates, and thereby a transition occurs to the state in which the one end portion of the operation lever 39 abuts on the upper stopper member 43 that is provided on the second link 35, and the bent portion 39*a* of the operation lever 39 abuts on the stopper 47 that is provided on the lower member 2*b* of the side frame 2. The rotational position of the operation lever 39 at this time is the lowered position of the operation lever 39. If the operation lever 39 in the lowered position is rotated upward, the lift-up wheels 29, which are at the non-ground-contact position hi as described above, can be lowered to the ground-contact position R2.

In this manner, if the lift-up wheels 29 are raised from the ground-contact position R2 shown in FIG. 3 to the non-ground-contact position R1 shown in FIG. 1, the auxiliary legs 49 provided on the side frames 2 come in contact with the running surface R. Accordingly, the vehicle frame 1 can be immovably supported by the front wheels 14 and auxiliary legs 49.

Incidentally, in FIG. 1, since the rear wheels 6 are attached, the auxiliary legs 49 lift from the running surface R. In the state in which the rear wheels 6 are detached, the auxiliary legs 49 are in contact with the running surface R.

Accordingly, even if the lift-up wheels 29 are raised to the non-ground-contact position R1 in the state in which the rear wheels 6 are detached, the vehicle frame 1 is supported by the front wheels 14 and auxiliary legs 49, and therefore it is possible to prevent the vehicle frame 1 from transitioning into an unstable state.

The rear wheels 6 may be attached to the vehicle frame 1, either at a time of the state in which the lift-up wheels 29 are lowered to the ground-contact position R2, or at a time of the state in which the vehicle frame 1 is immovably supported by the front wheels 14 and auxiliary legs 49.

The pedal member 51 is provided integral with the one side of the second link 35 by coupling the one end and the other end of the pedal member 51 to the third support shaft 36 and the fourth support shaft 36, and the pedal 53 is provided on the projection portion 52 at the intermediate portion of the pedal member 51.

Thus, in the state in which the lift-up wheels 29 are raised to the non-ground-contact position R1 as shown in FIG. 1, if the pedal 53 is pushed down, instead of the operation lever 39 being rotated upward, the projection portion 52 rotates downward with the fourth support shaft 37 functioning as a fulcrum.

Thereby, since the first link 33 and second link 35 move in interlock with the rotation of the projection portion 52, the lift-up wheels 29 can be lowered from the non-ground-contact position R1 to the ground-contact position R2. Specifically, by means of either the operation lever 39 or the pedal 53, the lift-up wheels 29 can be lowered from the non-ground-contact position R1 to the ground-contact position R2.

What is claimed is:

1. A wheelchair comprising:

a vehicle frame including a seat section and a back section;

a front wheel which comprises a universal caster, the front wheel being provided at a lower portion of a front end part of the vehicle frame;

a pair of rear wheels which are detachably attached to both sides in a width direction of a rear end part of the vehicle frame; and a lift-up wheel which comprises a universal caster and is provided at a lower portion of the rear end part of the vehicle frame such that the lift-up wheel is capable of being elevated between a ground-contact position and a non-ground-contact position by an elevation mechanism, the lift-up wheel being configured such that the lift-up wheel, together with the front wheel, movably supports the vehicle frame in a lowered state of the lift-up wheel at the ground-contact position, wherein the elevation mechanism includes:

a support arm having a first end that is pivotally attached to an intermediate portion in a back-and-forth direction of the vehicle frame, and having a second end, which is located on a rear end side, provided with the lift-up wheel;

a first link having a first end that is pivotally attached to the second end of the support arm;

a second link having an end that is pivotally attached to a second end of the first link, and having an intermediate portion that is pivotally attached to the vehicle frame;

an operation lever having a first end that is provided with an operation handle, and having a second end that is pivotally attached to the intermediate portion of the second link; and an upper stopper member and a lower stopper member provided on the second link at a predetermined interval in an up-and-down direction, wherein a portion of the operation lever is movable between the upper stopper member and the lower stopper member, wherein when the operation lever is further rotated upward from a position where the operation lever abuts on the upper stopper member, the second link and the first link move to rotate the support arm such that the lift-up wheel lowers from the non-ground-contact position to the ground-contact position, wherein when the operation lever is rotated to a neutral position where the operation lever abuts on the lower stopper member, from a state in which the lift-up wheel is lowered to the ground-contact position, one end portion of the operation lever, at which the operation handle is provided, moves down to a position which is lower than the seat section, without moving the second link and the first link, and wherein when the operation lever is further rotated downward from the neutral position where the operation lever abuts on the lower stopper member, the operation lever is configured to move the second link and the first link and to rotate the support arm such that the lift-up wheel rises from the ground-contact position to the non-ground-contact position.

2. The wheelchair of claim 1, further comprising:

a resilient member provided between an intermediate portion of the support arm and the intermediate portion of the second link, wherein the resilient member is configured to cause the support arm to resiliently move in accordance with movement of the second link when the operation lever is rotated downward to raise the lift-up wheel from the ground-contact position to the non-ground-contact position.

3. The wheelchair of claim 1, further comprising:

a pedal member having a first end that is pivotally attached to the intermediate portion of the second link and to the vehicle frame, and having a second end that is pivotally attached, together with the end of the second link, to the second end of the first link; and a pedal provided on an intermediate portion of the pedal member, and configured to move, when pushed down, the first link and the second link, and to rotate the support arm such that the lift-up wheel lowers from the non-ground-contact position to the ground-contact position.

4. The wheelchair of claim 1, wherein a footrest unit including a footrest is detachably provided on a front end side of the vehicle frame.

5. The wheelchair of any one of claims 1 to 3, wherein armrest units are provided on both sides in a width direction of the seat section such that the armrest units are retreatable from both sides in the width direction of the seat section.

6. The wheelchair of any one of claims 1 to 3, wherein a lower part of the rear end part of the vehicle frame is provided with an auxiliary leg which comes in contact with a ground when the rear wheels are detached from the vehicle frame and the lift-up wheel is raised to the non-ground-contact position.

* * * * *